Oct. 4, 1927.  
E. H. HAND  
1,643,985  
AUTOMATICALLY RECOILING HEIGHT MEASURING DEVICE  
Filed Jan. 12, 1924  
2 Sheets-Sheet 1
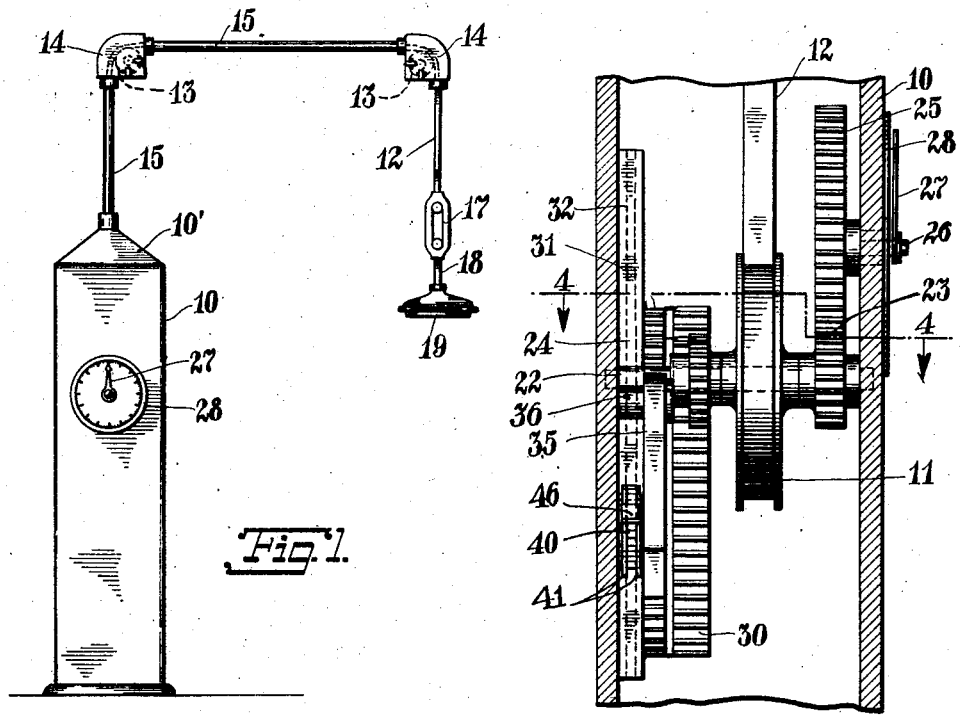
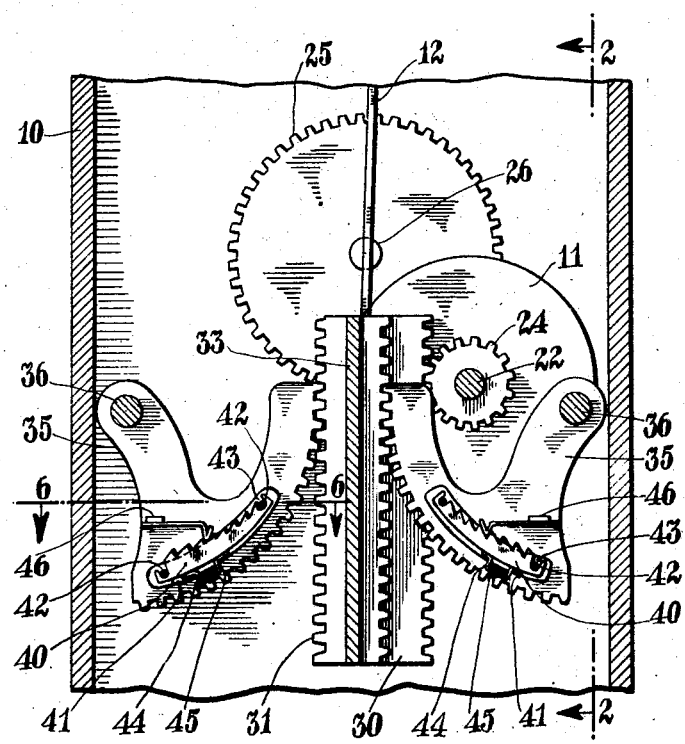
INVENTOR  
*Erle H. Hand*  
BY  
ATTORNEY Oct. 4, 1927.  
E. H. HAND  
1,643,985  
AUTOMATICALLY RECOILING HEIGHT MEASURING DEVICE  
Filed Jan. 12, 1924   2 Sheets-Sheet 2

INVENTOR  
*Erle H. Hand*  
BY  
ATTORNEY

Patented Oct. 4, 1927.

1,643,985

UNITED STATES PATENT OFFICE.

ERLE H. HAND, OF NEW BRITAIN, CONNECTICUT.

AUTOMATICALLY-RECOILING HEIGHT-MEASURING DEVICE.

Application filed January 12, 1924. Serial No. 685,756.

This invention relates to a height measuring device, the present invention being a further development of one disclosed in a previous application for patent filed by me on November 15, 1923, under Serial No. 674,858. The present invention has more particular reference to the means for causing automatic withdrawal of the measuring implement, and I therefore term my improved device an automatically recoiling height measuring device.

The present invention has for an object the provision of a novel device of this sort characterized by compact construction, and which can be readily attached to any spring or dial weighing machine.

For further comprehension of the invention and of the objects and advantages thereof, reference will be had to the following description and accompanying drawing, and to the appended claims in which the various novel features of the invention are more particularly set forth.

Fig. 1 of the drawing is a face view of my improved height measuring device.

Fig. 2 is a fragmentary transverse vertical sectional view, this view being taken on the line 2—2 of Fig. 3.

Fig. 3 is a fragmentary longitudinal vertical sectional view, this view being taken on the line 3—3 of Fig. 4.

Figure 4:
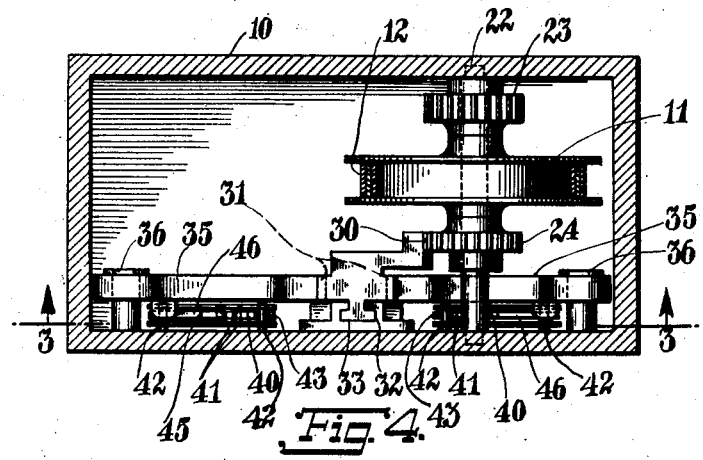
Fig. 4 is a horizontal sectional view taken on the line 4—4 of Fig. 2.
Figure 5:
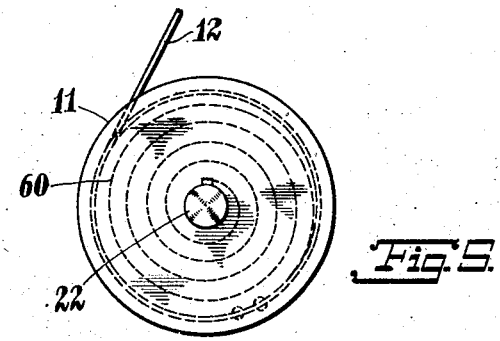
Fig. 5 is a detail view showing the spring in the drum.
Figure 6:
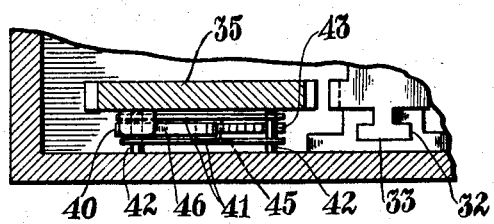
Fig. 6 is a fragmentary enlarged horizontal view taken on the line 6—6 of Fig. 3.

As here embodied my improved device comprises an upright casing or housing 10 which may be constructed of wood, metal or any suitable material, and which is here shown as formed with a tapering top 10'. In this housing a rotary drum 11 is supported and has attached thereto one end of a flat band or strap 12 which extends upward through the top of the casing and around a pair of pulleys 13 mounted in suitable supports 14 whose detail construction has been set forth in my above mentioned application, the strap 12 being confined in suitable conduits 15 extending between the top of the housing and one of the said supports and between the two supports. The other end of this strap 12 is connected by a swivel connection 17 with a stem 18 on a disk 19 which is adapted to rest on the head of the person being measured, these parts being also set forth in my said application. The pulleys 13, as will be understood, are formed with a flat surface to properly receive the strap 12, and are provided with side flanges to prevent displacement of the straps, similarly to the drum 11.

The drum 11 is mounted loosely on a shaft 22 fixed at opposite ends in the front and rear walls of the housing 10, and has fixed thereto the gear pinions 23 and 24 one on each side thereof. Contained within the drum is a clock spring 60 which is connected at opposite ends to said drum and the shaft 22. The pinion 23 meshes with a gear 25 on a stub shaft 26 supported in the front face of the housing 10, the outer end of this shaft 26 having fixed thereon a pointer 27 which registers with a dial 28, suitably graduated in feet or inches, or in metric measure if so desired. The pinion 24 meshes with a vertical rack element 30 which is fixed to a second rack element 31, this latter element being double faced as shown. The multiple rack-bar comprised by these two elements 30 and 31 is guided for vertical movements in a guide member 32 fixed to the rear wall of the housing, the rack element 31 having projecting T-rib 33 which engages the said guide element, these rack elements serving to connect the drum element to the counter-balancing device by which the parts 12, 17, 18 and 19 are balanced.

The counterbalancing device comprises a pair of weighted gear segments 35 of generally quadrantal form which are pivoted as at 36 to the rear wall of the casing and which engage the respective faces of the rack element 31. As will be apparent from the arrangement of parts shown in Fig. 3, the gear segments 35 act as a counterbalance since when the strap 12 is pulled to bring the head-piece 10 down upon the head of the person being measured the rack-bar 30 and 31 is caused to move upward, swinging the gear segments 35 upward, and when the head-piece is released the gear segments swing downward. To check the downward movement of these segments I have provided a novel means which comprises the arcuate ratchet bars 40 which are freely mounted between a pair of arcuate plates 41 fixed by pins 42 to the said wall. Each of the bars 40 has a notch 43 in each end in which the said pins 42 are received, the bar being held in position by means of a spring 44 which bears on the rear face thereof, this spring being fixed between its ends on a bridge piece 45 extending between the two plates 41. Carried by each of the segments 35 is a spring pawl 46 which is adapted to engage the ratchet teeth on the bars to check the return movement of the said segments. The spring 44, it will be noted bears on the bar 40 toward the lower end thereof, while the teeth on said bar are arranged to project progressively increasing distances above the plate 41. When the segments 35 swing downward the pawl 46 engages the transverse faces of the ratchet teeth which act as a brake, while in movement in the opposite direction the pawl engages the other faces of the ratchet teeth which then have little braking effect.

Having thus described my invention, what I claim as new and desire to protect by Letters Patent of the United States is as follows:

1. A height measuring device comprising a vertically movable head-piece, a dial, a pointer registering with said dial, and operative connection between said head-piece and the pointer, including a drum and a strap connected at opposite ends to said drum and head-piece, and resilient means engaged with the drum for returning the head-piece to normal position, and counterbalancing means including gear segments.

2. A height measuring device comprising a vertically movable head-piece, a drum, a spring connected therewith, a housing in which said drum is mounted, a strap attached at one end to said drum and at its other end to said head-piece, a dial on said casing, a pointer registering therewith, gear connections between said drum and pointer, a gear pinion fixed to said drum, a compound rack-bar having one rack element engaged by said pinion, and a weighted gear segment engaged with another rack element of said bar.

3. A height measuring device comprising a vertically movable head-piece, a drum, a housing in which said drum is mounted, a strap attached at one end to said drum and at its other end to said head-piece, a dial on said casing, a pointer registering therewith, gear connections between said drum and pointer, a gear pinion fixed to said drum, a compound rack-bar having one rack element engaged with said pinion, a weighted gear segment engaged with another rack element of said bar, and a braking element engaged with said gear segment to retard movement thereof when the said head-piece is being raised by the gear segment.

4. A height measuring device comprising a vertically movable head-piece, a drum, a housing in which said drum is mounted, a strap attached at one end to said drum and at its other end to said head-piece, a dial on said casing, a pointer registering therewith, gear connections between said drum and pointer, a gear pinion fixed to said drum, a compound rack-bar having one rack element engaged with said pinion, a weighted gear segment engaged with another rack element of said bar, and a braking element engaged with said gear segment to retard movement thereof when the said head-piece is being raised by the gear segment, said braking device comprising a pawl carried by the gear segment, and a ratchet toothed block on said housing engaged by said pawl.

In testimony whereof I have affixed my signature.

ERLE H. HAND.